United States Patent [19]

Löw et al.

[11] Patent Number: 4,718,538

[45] Date of Patent: Jan. 12, 1988

[54] METHOD AND APPARATUS FOR CONVEYING FLAT ARTICLES

[75] Inventors: Martin Löw, Gächlingen; Wolfgang Hertrich, Neuhausen am Rheinfall, both of Switzerland

[73] Assignee: SIG Schweizerische-Industrie Gesellschaft, Neuhausen am Rheinfall, Switzerland

[21] Appl. No.: 901,377

[22] Filed: Aug. 28, 1986

[30] Foreign Application Priority Data

Aug. 28, 1985 [CH] Switzerland .......................... 3703/85

[51] Int. Cl.$^4$ ............................................... B65G 43/10
[52] U.S. Cl. ..................................... 198/575; 198/423; 198/462; 198/572; 198/577
[58] Field of Search ............... 198/422, 571, 423, 572, 198/460, 573, 462, 464.1, 464.3, 464.4, 575, 577; 53/443, 447, 438, 439, 55, 542, 543; 271/149, 150, 151, 153, 154, 155

[56] References Cited

U.S. PATENT DOCUMENTS 4,548,404 10/1985 Brandt et al. .................... 198/462 X
4,640,408 2/1987 Eaves .............................. 198/577 X

FOREIGN PATENT DOCUMENTS 891543 3/1962 United Kingdom .
2001608 2/1979 United Kingdom .
2093225 8/1982 United Kingdom .

*Primary Examiner*—Robert J. Spar
*Assistant Examiner*—Lyle K. Kimms
*Attorney, Agent, or Firm*—Spencer & Frank

[57] ABSTRACT

A conveyor apparatus is divided into a plurality of end-to-end arranged conveyor tracks to advance flat items, in an edgewise upstanding, face-to-face engaging orientation to an item processing machine situated downstream of the conveyor apparatus. Each conveyor track is separately driven and is associated with a sensor which detects the extent of inclination of the items on the respective conveyor track. The drive of any individual conveyor track is de-energized if the items situated thereon assume an orientation having a steepness of predetermined extent and if, at the same time, the item processing machine and the drives of all conveyor tracks situated downstream of the individual conveyor track are at a standstill. Further, the drive of any individual conveyor track is energized and maintained energized if the items situated thereon assume a steepness less than the predetermined extent, or if the drive of any of the downstream-situated conveyor tracks or the item processsing machine is energized or is in an energized state.

10 Claims, 5 Drawing Figures

METHOD AND APPARATUS FOR CONVEYING FLAT ARTICLES

BACKGROUND OF THE INVENTION

This invention relates to a method and apparatus for conveying flat articles, particularly confectionary items, such as biscuits, from a baking oven to an article processing apparatus, such as a packing machine.

In the large-scale production of biscuits, the latter are conveyed to a packing machine from a stacking device arranged at the discharge end of a baking oven. The conveyor apparatus usually comprises a plurality of parallel-arranged conveyor troughs, such as vibratory conveyor troughs or conveyor belts. The conveyor troughs have a certain capacity for article accumulation so that short-term down periods of the packing machine may be compensated for without the need to direct the biscuits—which are continuously discharged from the oven—into a waste container.

In a known conveyor apparatus according to United Kingdom Pat. Nos. 2,001,608, 2,093,225 and 891,543 the above-noted storage (article accumulation) capacity is limited, particularly in case pressure-sensitive biscuits such as "cream crackers" are to be conveyed.

The conveyor apparatus disclosed in United Kingdom Pat. No. 2,001,608 has two separately driven partial conveyor tracks and an accumulating track provided therebetween. A friction wheel presses down onto the string of biscuits and thus enhances the conveying effect of the conveyor belt. The pressure force of the friction wheel is regulated by sensors which respond to the extent of inclination of the biscuits. In case the operation of an associated packing machine is interrupted, the biscuits are accumulated on the running conveyor belt. Dependent upon the length of accumulation, the pressure may reach such a magnitude that the delicate biscuits are crushed. Consequently, the capacity of accumulation of such an apparatus is also limited.

United Kingdom Pat. No. 2,093,225 discloses a conveyor apparatus in which a conveyor belt discharges the articles into a downwardly bent, stationary chute. In case of an interruption of the operation of the associated packing machine, the biscuits in the column accumulate and the column arches away from the bottom of the chute. An optical barrier measures such a motion and regulates the speed of the conveyor belt with a measuring signal. While with such an arrangement the problem of accumulation at the inlet of the packing machine is resolved, such problem is shifted, however, to the inlet end of the conveyor belt so that, as a result, this conveyor apparatus too, has only a limited capacity for article accumulation.

United Kingdom Pat. No. 891,543 discloses an apparatus in which the conveyor for the biscuit column is subdivided into two separately driven partial tracks. Above the frontal (downstream) track there is arranged a sensor which actuates a dosing device in case of a steep inclination of the biscuits on that track. Above a stationary trough situated between the partial tracks there is arranged a further sensor which, in case of a standstill of the biscuits, switches off the drive of the upstream partial track and, at the same time, actuates a gate which guides the biscuits discharged from the baking oven, to a standby packing machine. Because of the relatively small storage capacity, this system thus needs an additional packing machine which involves substantial expense.

SUMMARY OF THE INVENTION

It is an object of the invention to provide an improved method and apparatus of the above-outlined type with which the storage capacity can be significantly increased even in case of delicate articles such as breakable or deformable confectionary items.

This object and others to become apparent as the specification progresses, are accomplished by the invention, according to which, briefly stated, a conveyor apparatus is divided into a plurality of end-to-end arranged conveyor tracks to advance flat items, in an edgewise upstanding, face-to-face engaging orientation to an item processing machine situated downstream of the conveyor apparatus. Each conveyor track is separately driven and is associated with a sensor which detects the extent of inclination of the items on the respective conveyor track. The drive of any individual conveyor track is de-energized if the items situated thereon assume an orientation having a steepness of predetermined extent and if, at the same time, the item processing machine and the drives of all conveyor tracks situated downstream of the individual conveyor track are at a standstill. Further, the drive of any individual conveyor track is energized and maintained energized if the items situated thereon assume a steepness less than the predetermined extent, or if the drive of any of the downstream-situated conveyor tracks or the item processing machine is energized or is in an energized state.

By means of the successive switch-off of the partial tracks in case of a build-up of accumulation, the accumulation pressure of the subsequently supplied items is reduced immediately at the location where the pressure is generated and such pressure is transmitted to the bottom of the conveyor troughs forming the partial tracks. Therefore, the conveyor system may be of any desired length without the danger of an excessive accumulation pressure at the downstream end of the conveyor apparatus in case of a stoppage of the operation of the after-connected processing machine (packing machine). In this manner, a high storage capacity for the conveyor system is achieved so that short-term down periods of the packing machine do not lead to waste. The invention further ensures that after an operational standstill the conveyor system may resume operation without problems and without causing interruptions in the item column.

DESCRIPTION OF THE PREFERRED EMBODIMENT

Figure 1:
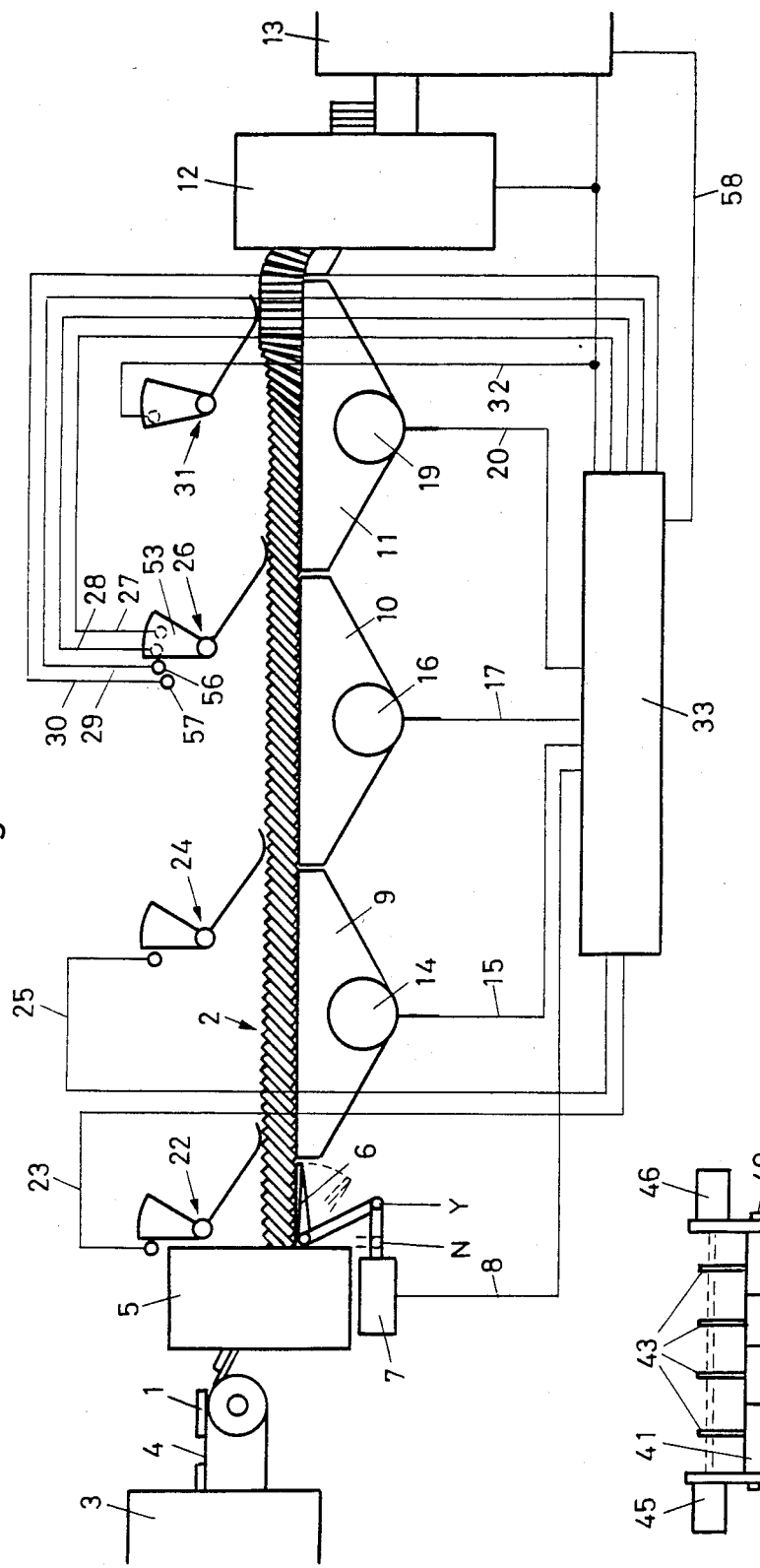
FIG. 1 is a schematic side elevational view, with block diagram, of a preferred embodiment of the invention.

Turning to FIG. 1, the conveyor system shown therein is, for the sake of clarity, divided into only three consecutive partial conveyor tracks. In order to increase the storage capacity, the system may be extended to have a greater number of partial conveyor tracks.

From a baking oven 3 biscuits 1 are advanced by means of an oven conveyor belt 4 to a stacking apparatus 5 which stacks the biscuits 1 to form a column 2 in which they are then transported by the conveyor apparatus in a face-to-face relationship and in an edgewise standing orientation. The conveyor apparatus has three partial tracks 9, 10 and 11 each formed of a separate vibratory conveyor driven by separate motors 14, 16 and 19, respectively, controlled by a regulating device 33 to which the motors are connected by conductors 15, 17 and 20, respectively. The inlet end of the first conveyor track 9 (that is, the conveyor track immediately downstream of the stacking apparatus 5) cooperates with a gate 6 actuated by an electromagnet 7 which is connected by a conductor 8 to the regulating device 33 to be controlled thereby. In its base position the gate 6 guides the biscuit column 2 onto the partial track 9 whereas in its alternate position it directs the biscuits into a waste container. The last partial conveyor track 11 advances the items into a feeder 12 which cooperates with the inlet of a packing machine 13.

With each partial conveyor track 9, 10 and 11, there is associated a separate sensor 22, 24 and 26 which senses the slope (steepness) of the biscuits 1 of the biscuit column 2. The two upstream sensors 22 and 24 have two-point sensing characteristics.

Figure 2:
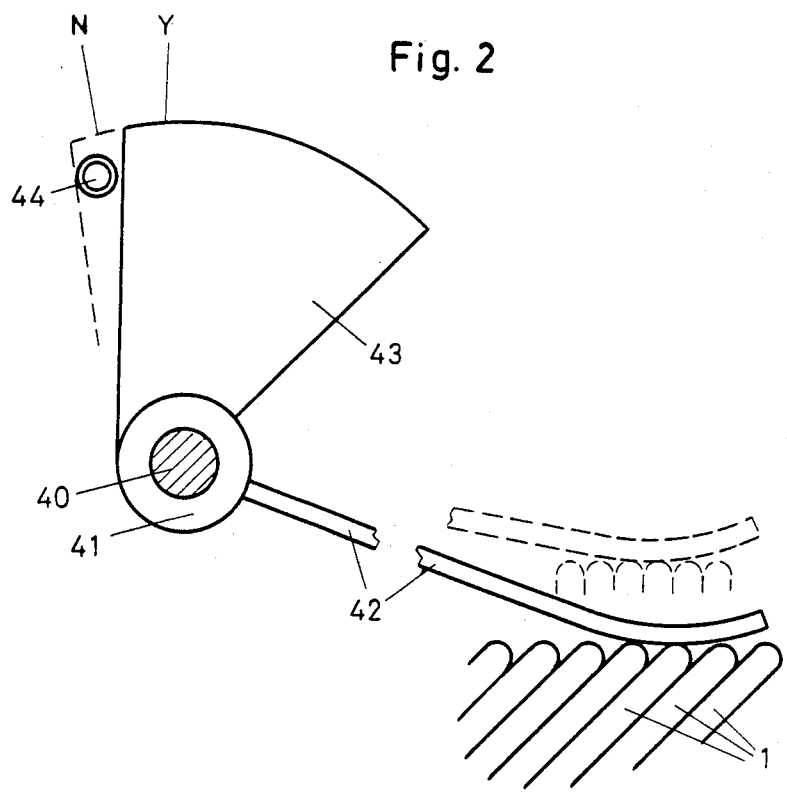
FIG. 2 is a schematic side elevational view, on an enlarged scale, of a sensor forming part of the preferred embodiment.

FIG. 2 illustrates the sensor 22 or 24 on an enlarged scale. The sensor has a sensor finger 42 which is in contact with the upper edge of the biscuits 1 of the column 2. The sensor finger 42 is affixed to a sleeve 41 which is rotatably mounted on a shaft 40 and to which there is affixed a switching plate (screen) 43 which, when the biscuits are in a steep position (shown in phantom lines), interrupts the light beam of an optical barrier 44 and thus generates a signal which is applied to the regulating device 33 by means of respective conductors 23 and 25.

Figure 3:
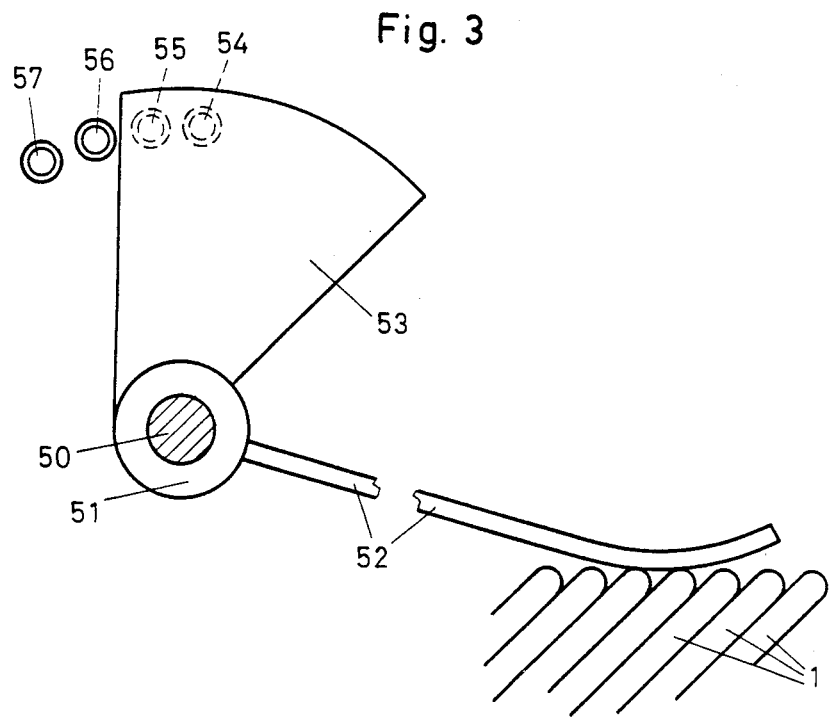
FIG. 3 is a schematic side elevational view, on an enlarged scale, of another sensor forming part of the preferred embodiment.

Turning now to FIG. 3, there is illustrated therein details of the sensor 26 which operates on the same principle as the sensors 22 and 24. The sensor 26 has a sensor finger 52 which is affixed to a sleeve 51 rotatably mounted on a shaft 50 and carrying a switching plate 53. With the sensor 26 there are associated four optical barriers 54, 55, 56 and 57 which are interrupted in sequence as the angle of inclination of the biscuits 1 changes. Thus, the sensor 26 measures the slope (steepness) of the biscuits 1 in several stages. The optical barriers 54-57 are connected with the regulating device 33 by respective conductors 27-30.

All three sensors 22, 24 and 26 sense the steepness of the biscuits at the upstream end of the partial conveyor track with which they are associated. If the optical barriers 44 for both sensors 22 and 24 and the optical barrier 57 of sensor 26 are interrupted then the partial conveyor tracks 9, 10 and 11 are each entirely filled, that is, they have reached their maximum storage capacity.

At the downstream end of the last partial conveyor track 11 there is arranged a further sensor 31 which is of a structure identical to that of sensors 22 and 24. Its signal is applied by a conductor 32 to the regulating device 33, the feeder 12 and the packing machine 13.

Figure 4:
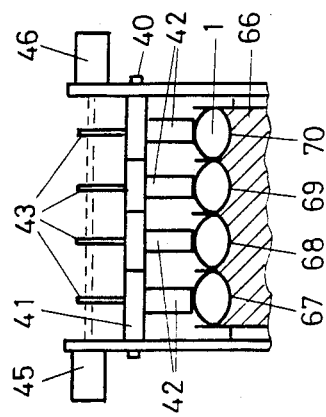
FIG. 4 is a schematic sectional end elevational view of part of the construction illustrated in FIG. 1.

Turning now to FIG. 4, each partial conveyor track is composed of a plurality of conveyor troughs 67, 68, 69 and 70 arranged in a side-by-side relationship and supported by a common carrier 66. Each trough 67-70 is associated with separate sensor fingers 42 (or 52) which are, by separate sleeves 41 (or 51), rotatably mounted on the common shaft 40 (or 50). The optical barrier which comprises a light source 45 and a detector 46 is common to all the switching plates 43 (or 53) so that the light beam emanating from the light source 45 is interrupted if in at least one of the parallel side-by-side arranged conveyor troughs 67-70 the biscuits 1 of the column 2 are in a steep, upright orientation. The sensor 31 has a ganged arrangement similar to sensors 22, 24 and 26, except that each of its side-by-side arranged switching plates is associated with a separate optical barrier.

In the normal operation the biscuit column 2 assumes an approximate position as shown in FIG. 1. Upstream of the feeder 12 the biscuits are accumulated in a vertical position and are cyclically taken in by the feeder 12. In case the article feed is insufficient, the sensor finger 42 of the sensor 31 drops. Thus, the associated switching plate moves out of the corresponding optical barrier and, as a result, a signal is applied to the feeder 12 and the packing machine 13 via the conductor 32, commanding the feeder 12 and the packing machine 13 to execute one or more empty cycles, whereupon upstream of the feeder 12 again an article accumulation will take place.

In case of a stoppage of the packing machine 13, the accumulation of the articles progresses from the right to the left as viewed in FIG. 1, that is, the biscuits 1 assume in succession in the leftward direction a more upright standing orientation. As such a progressive accumulation has reached the sensor 26, its switching plate 53 swings until the last optical barrier 57 is interrupted. A logic circuit in the regulating device 33 de-energizes the drive motor 19 as soon as the conductor 30 delivers a signal indicating that the light beam of the optical barrier 57 has been interrupted and at the same time, a signal is applied from the packing machine 13 to the regulating device 33 via the conductor 58 to indicate that the packing machine 13 is at a standstill.

As the partial conveyor track 11 becomes inoperative, the upright standing biscuits 1 transfer the accumulation pressure to which they are exposed, to the trough bottom, whereby the inlet of feeder 12 is relieved.

The accumulation propagates further towards the left until it reaches the sensor 24 which switches off, by means of the regulating device 33, the partial conveyor track 10 if, at the same time, the partial conveyor track 11 is at a standstill. Eventually, the accumulation reaches the sensor 22 at the upstream end of the first partial conveyor track 9. The sensor 22 de-energizes, again by means of the regulating device 33, the partial conveyor track 9 if, at the same time, the partial conveyor track 10 is at a standstill and, at the same time, opens the gate 6 so that in case of a fully loaded conveyor apparatus, that is, when all biscuits 1 in all partial conveyor tracks 9, 10 and 11 have an upright orientation, the biscuits 1 which are continued to be discharged from the oven conveyor 4 fall into a waste container.

By virtue of the successive stoppage of the partial conveyor tracks 11, 10 and 9 the accumulation pressure in the biscuit column 2 cannot exceed a limit value even if the conveyor apparatus is of substantial length and therefore has a large storage capacity.

When the packing machine 12, 13 resumes operation, the signal indicating standstill disappears from the conductor 58 and thus one of the two conditions for de-energizing the motor 19 is no longer present. As a result, the motor 19 is restarted and thus, the motors 16 and 14 also resume operation after a built-in delay.

The speed of the motors 16 and 14 is regulated by the sensor 26 such that the rpm of the motors 14 and 16 and thus the conveying speed of the partial conveyor tracks 9 and 10 is small if all the optical barriers 54–57 are interrupted by the switching plate 53. As the optical barriers 57, 56, 55 and 54 are opened successively, that is, the light beam of the respective light source reaches the respective detector, the rpm of the motors 14,16 is stepwise increased. Since the four switching plates 53 associated with the four troughs 67–70 act on the common optical barriers 54–57 it is the trough with the steepest biscuits which regulates the speed of motors 14,16. In this manner a frictionless start-up of the conveyor apparatus is ensured and interruptions in the biscuit column 2 cannot occur.

Since the motor 19 is not controlled by the sensor 26 and runs, from the beginning, with a nominal speed adapted to the cycle of the packing machine 13, immediately upon energization of the conveyor apparatus, at the location of the sensor 26 an imaginary line connecting the upper item edges is concave (depressed) as viewed from the sensor 26. This ensures that the starting biscuit column 2 does not develop a high accumulation pressure immediately upstream of the feeder 12. Such depression at the sensor 26 is preserved by an rpm regulation of the motors 14 and 16 even after start-up.

In order to further reduce the danger of an excessively high accumulation pressure of the biscuit column 2 in front of the feeder 12, the latter and the packing machine 13 may, after start-up, operate for a short period with a higher than nominal operational speed.

The partial conveyor tracks 9 and 10 may be driven by a common motor provided with separate clutches. Instead of a stepped sensing of the steepness of the biscuits 1 by the sensor 26, there may also be used an analog sensor in which the output signal of the sensor varies gradually as a function of the steepness of the biscuits.

It may be desirable to render inoperative the described rpm regulation of the motors 14 and 16 during normal operation of the conveyor apparatus so that the motors 14 and 16 run with the nominal rpm, independently of the position of the sensor 26. Such an arrangement is of advantage if during the normal operation of the conveyor apparatus biscuit columns are occasionally manually inserted and the delivery of biscuits 1 from the baking oven 3 is not effected with strict uniformity. The conveyor apparatus can compensate for such non-uniformities readily without the need for varying the conveying speed. For this purpose, the regulating device 33 may have a logic circuit which, upon the first drop of one of the side-by-side arranged sensors 31 disconnects the rpm regulation and reconnects it only when the motor 14 is de-energized. Thus, in such an arrangement the regulation of the conveying speed of the partial conveyor tracks 9 and 10 is in operation only during the start-up phase of the conveyor apparatus.

Figure 5:
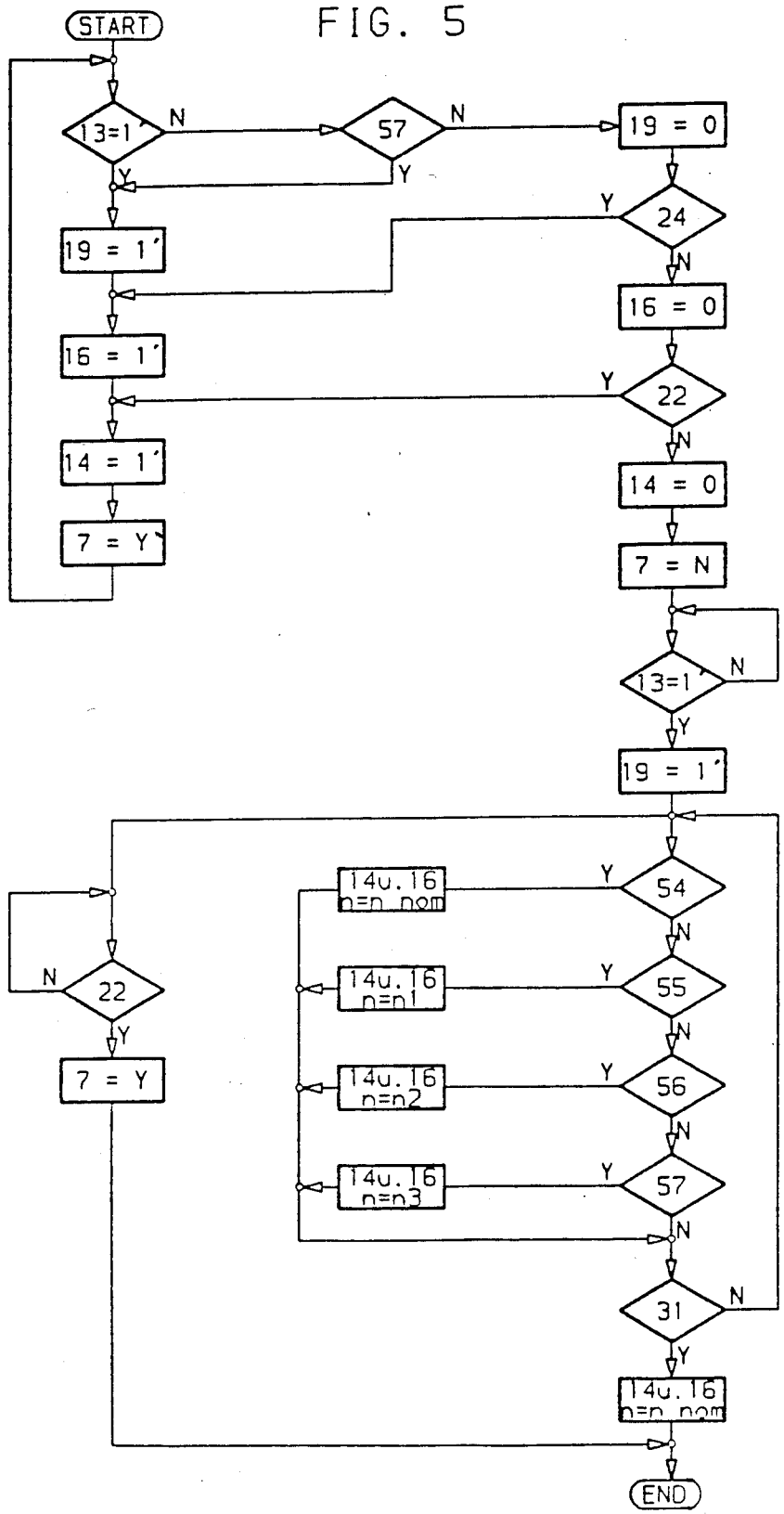
FIG. 5 is a flow diagram of the regulating device.

FIG. 5 shows a flow diagram of the regulating device 33. The numbers in this diagram correspond to the reference numerals in FIGS. 1 to 4. The additional symbols mean: Y=yes, N=no, = =switched off, 1'=switched on, n=speed of motors 14 and 16 whereby $n_{nom} > n_1 > n_2 n_3$. The diagram of FIG. 5 is self-explanatory.

It will be understood that the above description of the present invention is susceptible to various modifications, changes and adaptations, and the same are intended to be comprehended within the meaning and range of equivalents of the appended claims.

What is claimed is:

1. In a method of conveying flat, edgewise upstanding, face-to-face contacting items in at least one item column divided into a plurality of serially arranged column parts on a plurality of end-to-end arranged conveyor tracks forming together a conveyor apparatus arranged to advance the items to an item processing machine situated downstream of the conveyor apparatus; including the steps of separately driving each conveyor track and sensing, by separate sensors associated with each conveyor track, the extent of inclination of the items on each conveyor track; the improvement comprising the following steps:
   (a) de-energizing the drive of any individual said conveyor track if the items situated thereon assume an orientation having a steepness of predetermined extent and if, at the same time, the item processing machine and the drives of all conveyor tracks situated downstream of said individual conveyor track are at a standstill; and
   (b) energizing and maintaining energized the drive of any individual said conveyor track if the items situated thereon assume a steepness less than said predetermined extent, or if the drive of any of the downstream-situated conveyor tracks or the item processing machine is energized or is in an energized state.

2. A method as defined in claim 1, wherein one of the conveyor tracks is a last conveyor track as viewed in a direction of article conveyance on the conveyor apparatus; the sensor associated with said last conveyor track being a last sensor; further comprising the step of regulating the speed of the drives of each said conveyor track situated upstream of said last conveyor track, at least for a limited time following an energization of the drives of the conveyor tracks upstream of said last conveyor track.

3. A method as defined in claim 2, further comprising the step of stepwise varying, by said last sensor, the speed of the drives of the conveyor tracks situated upstream of said last conveyor track.

4. A method as defined in claim 1, wherein one of the conveyor tracks is a first conveyor track as viewed in a direction of article conveyance on the conveyor apparatus; the sensor associated with said first conveyor track is a first sensor; further comprising the step of opening a discharge gate, by a signal from said first sensor, simultaneously with a de-energization of the drive of said first conveyor track, for preventing items from being admitted to said conveyor apparatus.

5. A method as defined in claim 1, wherein each said conveyor track has a plurality of side-by-side arranged conveyor troughs being commonly driven by an associated said drive, each said conveyor trough being associated with a separate sensor; further comprising the step of de-energizing the drive of any conveyor track if the items in any of the conveyor troughs thereof assume the steepness of said predetermined extent.

6. A method as defined in claim 5, wherein one of the conveyor tracks is a last conveyor track as viewed in a direction of article conveyance on the conveyor apparatus; further comprising the step of regulating the speed of the drives of each said conveyor track situated upstream of said last conveyor track as a function of that conveyor trough of the last conveyor track in which the items are at a steepest orientation with respect to other conveyor troughs of said last conveyor track.

7. In a conveyor apparatus for advancing flat, edgewise upstanding, face-to-face contacting items in at least one item column, including a plurality of end-to-end arranged conveyor tracks; a separate drive operatively connected to each said conveyor track; an item processing machine arranged downstream of said conveyor apparatus and receiving items therefrom, the improvement comprising separate sensor means associated with each conveyor track for detecting an inclination of the items on the conveyor track and for emitting a signal if a predetermined steepness of the items is reached; and logic circuit means connected to said sensor means, said drives and said item processing machine for de-energizing the drive of any individual said conveyor track if the items situated thereon assume an orientation having a steepness of predetermined extent and if, at the same time, the item processing machine and the drives of all conveyor tracks situated downstream of said individual conveyor track are at a standstill and for energizing and maintaining energized the drive of any individual said conveyor track if the items situated thereon assume a steepness less than said predetermined extent, or if the drive of any of the downstream-situated conveyor tracks or the item processing machine is energized or is in an energized state.

8. A conveyor apparatus as defined in claim 7, wherein each said sensor means comprises a sensor member situated at an upstream end of the conveyor track with which it is associated.

9. A conveyor apparatus as defined in claim 8, wherein one of the conveyor tracks is a last conveyor track as viewed in a direction of article conveyance on the conveyor apparatus; the sensor means associated with said last conveyor track including means for emitting a signal varying as a function of a gradual change of steepness of the items on said last conveyor track.

10. A conveying apparatus as defined in claim 7, wherein each said sensor means comprises a pivotally supported sensor finger contacting upper edges of the items for changing pivotal positions as a function of the steepness of orientation of the items; a light source; a detector responding to light emitted by the light source; and a screen rigidly affixed to said finger and arranged to interrupt or allow passage of the light from the light source to the detector as a function of pivotal positions of said finger.

* * * * *